Oct. 30, 1962 H. GELLING 3,061,186
MECHANISM FOR TAKING NEGATIVE TOTALS
Filed Aug. 13, 1956 2 Sheets-Sheet 1
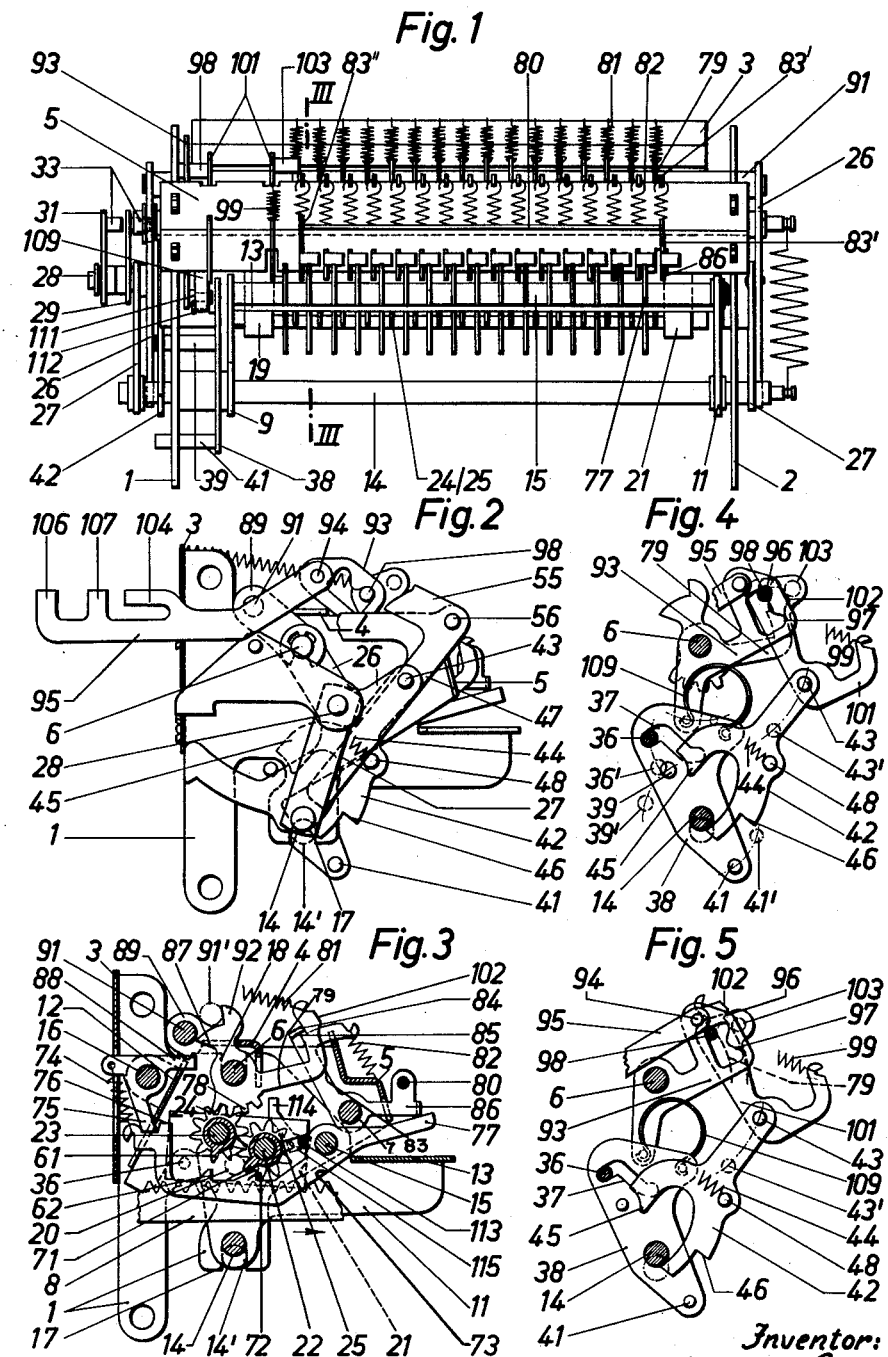

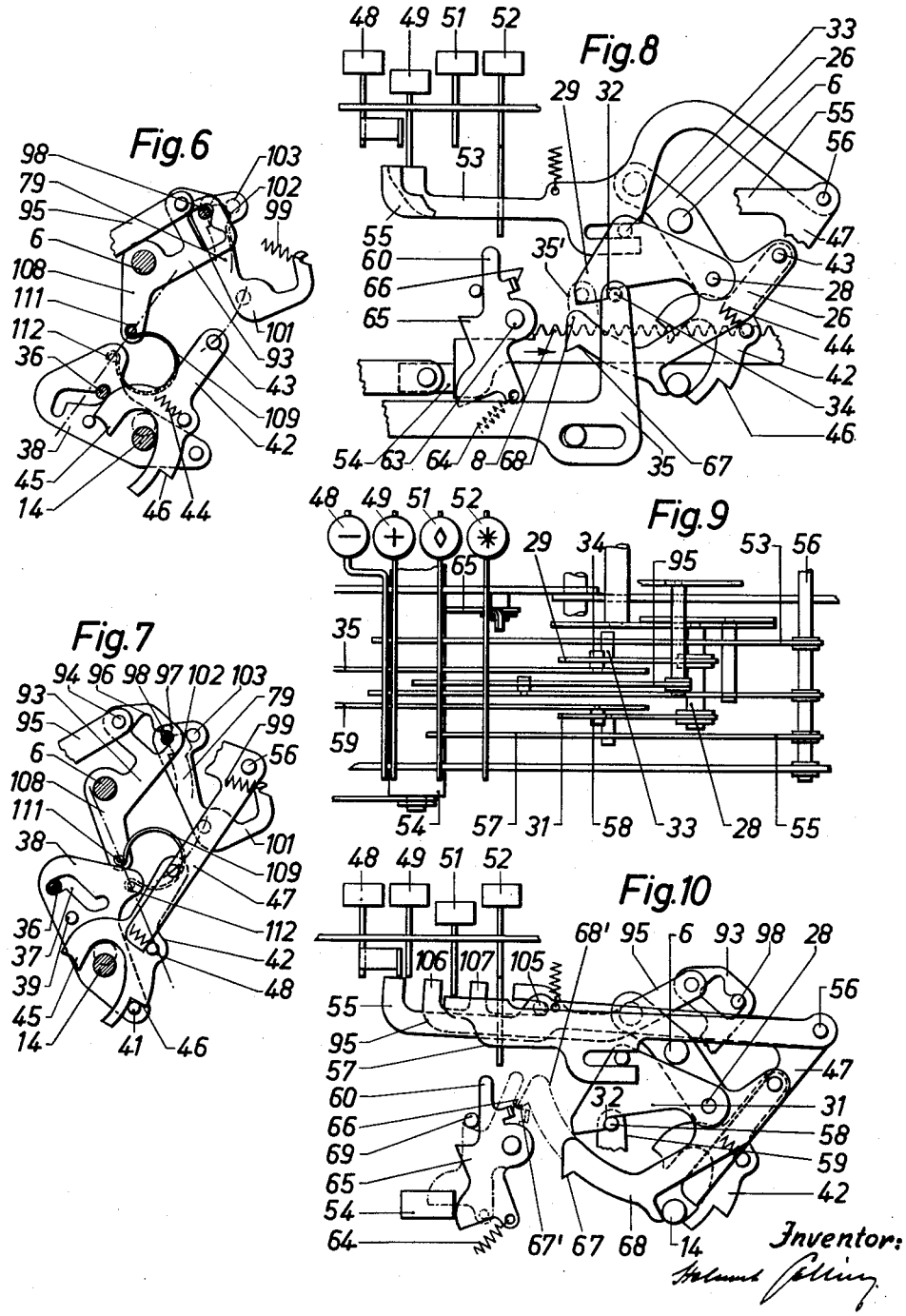

United States Patent Office 3,061,186
Patented Oct. 30, 1962

3,061,186
MECHANISM FOR TAKING NEGATIVE TOTALS
Helmut Gelling, Ulm, Germany, assignor to Walther Buromaschinen Gesellschaft m.b.H., Gerstetten, Wurttemberg, Germany, a firm
Filed Aug. 13, 1956, Ser. No. 603,718
Claims priority, application Germany Aug. 25, 1955
5 Claims. (Cl. 235—60.2)

The invention relates to a mechanism for taking negative totals from balance totalizers, i.e. totalizers of calculating machines into which the amounts may be introduced additively or subtractively, and the counting wheels of which are returned up to their zero position in subtractive direction in order to take a positive total, whilst they are returned additively up to "9" for taking a negative total after a negative fugitive "1" has been introduced into the unit order. To subsequently take a positive total a positive fugitive "1" has to add again to the unit order.

The introduction of the subtractive or additive fugitive "1" into the unit order, with known calculating machines, mostly is brought about by means of transfer organs connected with each other of the highest and lowermost denominational orders. To actuate the totalizer wheels in the adding or subtracting direction by the differential actuating members adjusted in accordance with the depressed amount keys of the machine the totalizer may comprise adding and subtracting wheels being constantly in mesh with each other and brought alternatively into engagement with said differential actuating members. In the case of only one totalizer wheel in each order, the actuating members have to be brought into engagement with the totalizer wheels in addition and subtraction in corresponding intervals of time during the to or fro movement of the actuating members.

In order to take a positive total the totalizer is to be positioned for additive actuation, in order to take a true negative total it is to be positioned for subtractive actuation as will be fully explained later on.

For reversing the totalizer according to the + or − sign of the total contained in the totalizer, prior to the accomplishment of the total taking operation, signalling or locking means may be used which indicate or enforce the necessary reversing to subtraction or to addition, respectively.

It is also known in the art to automatically perform the reversing of the totalizer to additive actuation in the presence of a negative total in the totalizer so that on total taking, besides the actuation of the setting member for the total or the subtotal, any other manipulation is not necessary and no considerations are to be made by the operator whether the state of the totalizer is positive or negative.

It is further known to provide a control member which is automatically positioned into one of two positions in accordance with the positive or negative state of the totalizer and to connect this control member with a particular disengageable total key member movably mounted on the subtracting key member of the machine, whereby on depressing of the total or subtotal key, the totalizer will be prepared for subtracting when the state of the totalizer is negative.

Machines of such kind are comparatively complicated having a great number of pawls, detents, springs and the like.

In order to substantially simplify the last mentioned structure and to increase its accuracy according to the invention, a pressure spring pressing with its one end against a rocking member for said totalizer movable into an additive or subtractive position and with its other end against a control member adjusted according to the positive or negative state into one of its two end positions. Said pressure spring cooperates with said control member and rocking member, so that the connecting line between the two attaching points of the spring can be situated at the one or the other side of the axis of the control member and that if the control member is in its negative position, it will be urged into its positive position when the rocking member assumes its additive position and vice versa. Furthermore, the locking of the control member in its two positions is positive whereby the possibility is avoided that the controlling member is displaced owing to concussions of the machine.

Further characteristics of the invention result from the following description of an example of embodiment.

In the accompanying drawing:

FIG. 1 is a front elevation of the totalizer.

FIG. 2 is an elevation of the totalizer viewed from the left.

FIG. 3 is a section on the line III—III of the FIG. 1.

FIG. 4 is a side view of the mechanism connected with the control member in the negative position and the subtracting position of the rocking member.

FIG. 5 is a corresponding view in the released negative position of the control member and the subtracting position of the rocking member.

FIG. 6 is a corresponding view of the locked negative position of the control member and the adding position of the rocking member.

FIG. 7 is a corresponding view in the locked positive position of the control member and in the subtracting position of the rocking member.

FIG. 8 is a side elevation of the controlling mechanism for the totalizer together with the operation keys.

FIG. 9 is a top view appertaining thereto.

FIG. 10 is a view according to FIG. 8 together with other particulars.

Rigidly connected to the machine frame is a frame consisting of side walls 1, 2 (FIG. 1) and combs 3, 4, 5 (FIG. 3) connecting the side walls wherein axles 6, 7 are mounted and amount differential actuating members 8 are arranged shiftably to and fro. Within this frame 1 to 5 a totalizer frame is movably mounted which is composed of side walls 9, 11 (FIG. 1) and comb sheets 12, 13 (FIG. 3) connecting the side walls. The totalizer frame carries rigid shafts 14, 15, 16 (FIG. 3). The shaft 14 is guided in open slots 17 of the side walls 1, 2 of the rigid frame, whilst slots 18 of the side walls 9, 11 embrace the shaft 6 of the rigid frame, so that the totalizer frame can be moved upwards and downwards by raising and lowering of the shaft 14. Within the totalizer frame, a totalizer wheel cradle consisting of side blocks 19, 21 (FIG. 1), and totalizer wheel axles 22, 23 (FIG. 3) rigidly connecting the side blocks with each other is formed. On the totalizer wheel axles 22, 23, the adding wheels 24 and the subtracting wheels 25 permanently in mesh with each other are loosely mounted. The totalizer wheel cradle 19 to 25 is rockably mounted in the side walls 9 and 11 of the totalizer frame 9, 11, 12, 13 by means of lateral pins 20 (FIG. 3), in such a way, that on lowering the totalizer frame either the adding wheels 24 or the subtracting wheels 25 come into mesh with the actuating members 8.

For the purpose of lowering and raising the totalizer frame the two axles 6 and 14 are connected at each end with each other by a toggle joint 26, 27 (FIG. 2). In the stretched position of this toggle joint the shaft 14 and therewith also the totalizer frame is lowered and the totalizer wheels 24 or 25, respectively, are in mesh with the actuating members 8. In the broken position of the toggle joint, as represented in FIG. 2, the shaft 14 and therewith the totalizer is lifted, so that the adding and subtracting wheels 24, 25 (FIG. 3) are out of mesh with the actuating members 8. In the stretched position of the toggle joint the shaft 14 assumes its low position 14' represented by dash- and dotted lines in FIGS. 2 and 3, in which the adding or subtracting wheels 24, 25, respectively, are in mesh with the actuating members 8.

Stretching of the toggle joint will be effected by the movement of the toggle joint pin 28 (FIG. 2) towards the left against spring action. For this purpose coupling pawls 29, 31 are rotatably mounted (see also FIGS. 8 and 9) on the pin 28 at the left hand side of the totalizer (FIG. 1). The coupling pawls are provided at their lower side (FIG. 8) with lugs 32 and at their upper side with lateral pins 33. The latter cooperate with the operation keys and will be moved downwards by them together with their pawls. On the lowering of the coupling pawl 29 (FIG. 8), the lug 32 of it arrives in the path of movement of a lateral pin 34 of a driving bar 35 which, during the machine operation, will be moved and returned from the position marked in full lines to the position marked in dash- and dotted lines 35'. During the movement into the position 35' the pawl 29 being in mesh with the pin 34, the toggle joint pin 28 is moved to the left so that the toggle joint will be stretched and the totalizer will be lowered into mesh with the actuating members 8.

The rocking of the totalizer wheel cradle about the rocking pin 20 (FIG. 3) into the adding or subtracting position is likewise brought about by the stretching movement of the toggle joint. To this end the totalizer wheel cradle is provided with a pin 36 (FIG. 3) at one of its sides which engages a curved slot 37 (FIG. 4) of a rocking member 38. The latter is rotatably mounted on the shaft 14 and provided with coupling pins 39, 41 at both sides of the shaft. The coupling pins cooperate with a push fork 42 which is linked to the multi-armed toggle joint member 26 (FIG. 2) by means of a pin 43. The push fork 42 is under the action of a spring 44, which tends to rotate it clockwise into its adding position. The push fork 42 cooperates with the coupling pins 39, 41 by means of the lugs 45, 46 (FIG. 4) of its fork prongs.

When, in the rocked position of the push fork represented in FIG. 4, the pin 43 is moved into the position 43' on stretching the toggle joint, the lug 45 acts upon the pin 39 so that the latter arrives at the position 39' and the rocking member 38 moves the pin 36 of the totalizer wheel cradle into the position 36'. The totalizer wheel cradle being rocked thereby about its rocking pin 20, in such a way, that the adding wheels 24 (FIG. 3) come into engagement with the actuating members 8. The coupling pin 41 (FIG. 4) thereby arrives at the position 41'. When the pushing fork 42 has been displaced by the action of a setting member arm 47 (FIG. 2) on its pin 43 against the action of the spring 44, thus that the taking along lug 46 comes to lie above the coupling pin 41' (FIG. 4) on the stretching of the toggle joint, the rocking member 38 will be rocked back into the position represented in FIG. 4 by full lines, in which the totalizer is again reversed to subtracting, i.e., the subtracting wheels are again in engagement with the actuating members 8.

As setting means for the different operations of the machine four keys 48 (subtracting), 49 (adding), 51 (subtotals), 52 (totals) (FIGS. 8, 9) are provided. The keys 48, 49 (FIG. 8) cooperate with a key lever 53, spring influenced upwardly, which brings the above mentioned coupling pawl 29 into mesh with the driving bar 35. This driving bar 35 is moved to the left at the beginning of the second half of the cycle of operation, in a manner known per se for instance by the German Patent No. 50,324, therewith bringing the totalizer into mesh with the actuating members 8, after the latter have been adjusted by a movement to the left into their value positions according to the depressed amount keys during the first half of the cycle of operation and after being released by a restoring bar 54. As soon as a totalizer has been brought into mesh the actuating members 8 are moved again to the right whereby the value contained in the actuating members 8 will be additively or subtractively transmitted to the totalizer wheels.

When the adding key 49 is depressed the push fork 42 remains in its rocking position represented in FIG. 4, so that the adding wheels 24 are brought into mesh with the actuating members 8, whilst, when the subtracting key 48 which is depressed in addition to the key lever 53 an arm 55 (FIG. 10), is rotated about its bearing pin 56 so that the above mentioned arm 47, connected with the arm 55, will rock, in the described manner, the push fork 42 into its subtracting preparation position so that upon subsequent operation of the machine the subtracting wheels 25 will be brought into mesh with the actuating members 8.

When the total key 52 (FIG. 10) is depressed the coupling pawl 31 will be lowered by means of a key lever 57 likewise mounted on the shaft 56, the coupling pawl 31 arriving thereby with its lug 32 in the path of movement of a pin 58 of a second driving bar 59 (FIG. 9). The latter, however, is not moved to and fro during the second half of the cycle of operation but in the first half, i.e. at the beginning of the cycle of operation to the left and at the end of the first half of the cycle of operation again back to the right. Accordingly, after depressing the total key 52 the totalizer will be engaged at the beginning of the cycle of operation before the actuating members 8 are released from the restoring bar 54 for their adjusting movement towards the left under the action of their springs. When the restoring bar 54 is moved towards the left the actuating members 8 will be moved likewise to the left under the action of their springs taking along them the adding wheels 24 being in mesh with them until the tens teeth 61 (FIG. 3) are stopped by the straight flank of the tens counter teeth 62. The actuating members 8 are then positioned to the positive total value of the totalizer which will be printed in the printing mechanism. After unmeshing the totalizer by breaking the toggle joint by the movement to the left of the driving bar 59 the actuating members 8 will be returned into their zero position, the unmeshed totalizer remains in its zero position.

On the subtotal taking which is introduced by depressing the subtotal key 51 (FIGS. 8 and 9), the totalizer wheels must retain their total value after the total taking, has finished. To this end it is necessary that the totalizer wheels are disengaged from the actuating members 8 only after the return movement of the actuating member has been finished.

To this end a locking pawl 65 is provided which is clockwise influenced under the action of a spring 64 and mounted on a rigid pin 63 (FIG. 8). This locking pawl 65 cooperates with a lug 67 of a projection 68 of the toggle joint member 26 by means of a lug 66. When the subtotal key 51 has been depressed the toggle joint pin 28 will be coupled upon the subsequent operation of the machine in the same manner with the driving bar 59 as in total taking over the key lever 57 (FIG. 10) so that also in this case, at the beginning of the cycle of operation, the adding totalizer wheels mesh with the actuating members 8 and will be positioned to zero upon releasing of the actuating members from the restoring bar, whereby the tens teeth 61 (FIG. 3) abut against the tens counter teeth 62.

When the stretched position of the toggle joint is performed, the projection 68 is in the position 68' represented in FIG. 10 by dash and dotted lines, so that the lug 66 of the locking pawl 65 snaps under the locking face 67', holding the toggle joint in its stretched position in which the totalizer remains in mesh with the actuating members 8. Accordingly, the totalizer will not be again disengaged at the end of the first half of the machine operation but remains until the end of the second half of the cycle of operation in mesh with the actuating members so that its totalizer wheels are returned again to the total value which was previously contained in the totalizer. At the end of the second half of the machine operation the restoring bar 54 returns to its home position represented in FIG. 10, thereby striking the displaced locking pawl 65 and returning same till it touches an abutment pin 69 in which position the arm 68 is already freed so that the toggle joint can return into its broken position under the action of its spring.

In order to avoid that the locking pawl 65 disturbs the total taking it is held in its ineffective position by means of its upper projection 60 by the depressed total key. During the adding and subtracting operations of the machine the engagement of the projection 68 with the pawl 65 remains without influence on the action of the toggle joint, as the stretching or flexing of the latter takes place at the beginning of the second half of the operation of the machine. At the end of the stretching the engagement of the projection 68 is released when the restoring bar strikes against the locking pawl 65.

When, on subtracting, the positive state of the totalizer has been changed to a negative one, a complement value of the true negative total would be printed when the total would be taken in the same manner as with a positive total, i.e. by rotating the totalizer wheels in subtractive direction to the position "zero." In this complement value the unit order shows the complement to "10," the other orders show the complement to "9." In order to print the true negative total the totalizer wheels must be rotated in additive direction after a subtractive "fugitive one" has been introduced into the unit order of the totalizer. Moreover, when the totalizer in the following operation, changes again to a positive state an additive "fugitive one" must be introduced into the lowermost order in order to rectify the value contents of the totalizer for a following taking of a positive total. These suppositions are fulfilled in the represented embodiment in that, in a known manner, upon the taking of a negative total the totalizer will be reversed to subtracting actuating and the tens transfer organs of the highest and lowermost order being connected with each other thus that a passage from 0 to 9 or from 9 to 0 in the highest order will be followed by a tens transfer accomplishment in the lowermost order.

For a better understanding of this contrivance the tens transfer mechanism first will be explained more fully. The tens teeth 61 (FIG. 3) of the adding totalizer wheels 24 cooperate, as already mentioned, with tens counter lugs 62. The tens teeth 71 of the subtracting totalizer wheels 25 cooperate with the tens counter lugs 72. The tens counter lugs 62 and 72 are secured to the tens counter levers 73 rotatably mounted on the shaft 15. When a passage takes place in an order the corresponding tens counter lever will be rocked against the action of its spring 74 in counter clockwise direction about the shaft 15 so that the lower end of a locking lever 75 likewise influenced by the spring 74 will be moved over a lug 76 of the tens counter lever 73 and thereby holding fast the latter in its rocked preparation position, in which its projection 77 is rocked upwards. On the disengagement of the totalizer from the actuating members 8 the totalizer comes in engagement with gears 78 of tens actuating levers 79 located opposite the actuating members 8. When the adding totalizer wheels 24 had been in mesh with the actuating members 8 the subtractive wheels 25 come in mesh with the gears 78 and when the subtracting totalizer wheels had been in mesh with the actuating members the adding totalizer wheel 24 come in mesh with the gears 78. The tens actuating levers 79 are rotatably mouned on the shaft 6, which are influenced by springs 81 counter clockwise. These tens actuating levers 79 are normally locked against the action of the springs 81 by locking levers 83 mounted on the shaft 7 and influenced by springs 82, in that bent over ears 84 of the levers 83 come to lie over locking lugs 85 of the tens actuating levers. Projections 86 of the next higher order cooperate with the projection 77 of the tens counter levers. When the totalizer is disengaged in the above described manner from the actuating members 8 the projections 77 of the tens actuating levers 73, kept in the preparation position, will strike the projections 86 from below so that the locking levers 83 will be rotated clockwise against the action of their springs releasing their tens actuating levers 79 for a counter clockwise movement. The pairs of totalizer wheels 24, 25 being in mesh with the gears 78 of the next higher orders will be rotated further by one unit on the rotation of the released tens actuating levers. When thereby a passage from 9 to 0 or from 0 to 9 takes place in the concerned order the appertaining tens counter levers 73 will be rotated counter clockwise so that the next higher order will be actuated further by one unit over the levers 89, 73, a process which under circumstances continues until the highest order.

On the rotation of a tens actuating lever 79 a nose 87 fixed to it strikes a projection 88 of the preparation locking lever so that the locking arm 75 of the latter will be moved off the locking face 76 so that the tens counter lever 73 returns again into its position of rest represented in FIG. 3.

The members 26 (FIG. 2) of the toggle joint carry on an upper projection 89 a restoring bar 91 which upon the stretching of the toggle joint, i.e. at the bringing in mesh of the totalizer with the actuating members 8 during the next operation of the machine will be moved into the position 91', represented in FIG. 3 by dash and dotted lines. The restoring bar 91 thereby strikes noses 92 of the tens actuating levers 79 returning them into their position of rest represented in FIG. 3, in which the locking levers 83 again are placed over the locking lugs 85.

In order to transmit a tens transfer from the highest to the lowermost order a tens actuating lever 79 cooperates also with the totalizer wheels of the unit order which likewise will be locked by a lever 83' (FIG. 1). The lever 83' is secured to the right hand end of a bar 80 (FIG. 3), the left hand end of which is rigidly connected with the lever 83'' (FIG. 1) which is found in the reach of the highest totalizer order. The lever 83'' cooperates with a tens counter lever 73 in the manner described allotted to the totalizer wheels 24, 25 of the highest order.

When in the subtracting position of the totalizer wheel cradle 19, represented in FIG. 3, a passage from zero to 9 takes place by subtractive actuation, the tens counter lever 73 of the highest order also will be rocked counter clockwise into its preparation position, so that on disengaging of the totalizer from the actuating members 8 by breaking the toggle joint by means of the projection 77 and the levers 86, 83'' of the highest order, the locking lever 83', arranged before the lowermost order will be displaced and the tens actuating lever 79 of the lowermost order will be released in order to add a subtractive unit to the unit order.

When on subtracting, the subtracted value is greater than the positive state of the totalizer by an amount of, for instance 23 units, whereby the totalizer wheels have been positioned to 9999977, they will be, after addition of the negative fugitive "1" to the unit order, positioned to 9999976, so that on additive returning of the totalizer wheels to 9999999 the totalizer wheels and the actuating members being in mesh therewith will be moved accordingly to the true, negative total into the position 0000023.

When now subsequently, on adding, the added value is greater than the negative state of the totalizer and the totalizer assumes again a positive state, a fugitive "1" will be added to the unit order in a known manner in order that, on taking a positive total, the correct positive total value will be obtained.

For automatically bringing the totalizer wheel cradle 19 to 23 into the rocking position represented in FIG. 3 on taking a negative total, a control member 93 mounted on the shaft 6 (FIG. 2) is provided for, to which an adjusting bar 95 is linked by means of a pin 94. The control member 93 (FIG. 4) is provided with two notches 96, 97 cooperating with a pin 98 of a locking lever 101 influenced by a spring 99 for holding the control member 93 in one of its two end positions. The tens actuating lever 79 located on the left of the highest order and additively actuating the unit order is provided with a lug 102 cooperating with a lock-pin 103 of the locking lever 101. When the said tens actuating lever 79 is found in its tensioned position of rest the lug 102 lies below the lock pin 103, as represented in FIGS. 4, 6, 7, so that the pin 98 will be locked in one of its notches 96 or 97. When the tens actuating lever 79 will be released, whereby its locking lug 102 is moved upwards (FIG. 5) the locking pin 103 is freed and the pin 98 can move out of its notch following the pull of the spring 99.

The adjusting bar 95 (FIG. 2), linked to the control member 93, embraces by means of a slot 104 a lateral pin 105 (FIG. 10) of the above mentioned key counter lever 55 cooperating with the subtracting key 48. This key counter lever 55 moves as described, by means of its arm 47 the push fork 42 into the preparation position for displacing the totalizer wheel cradle into the subtracting position. The adjusting bar 95 (FIG. 2) is provided with two key counter lugs 106, 107 which in the shifted position corresponding to the positive position of the control member 93 as represented in FIG. 10, being out of the reach of the stems of the total keys 51, 52. When, however, the control member 93 is found in its negative position (FIG. 5) the two counter lugs 106, 107 are shifted to the right so far that they lie in the path of the total keys 51, 52, so that they will be moved downwards on depressing of one of the keys. This results in a corresponding rocking of the key counter lever 55 which, by means of its arm 47, displaces the push fork 42 into the preparation position for adjusting the totalizer wheel cradle into the subtraction position. On the following cycle of operation the subtracting wheels 25 (FIG. 3) engage, therefore, the actuating members 8 so that on the movement to the left of the latter under the action of their springs, the tens teeth 71 of the subtracting wheels will be drawn additively onto the tens counter teeth 72 where they are held fast in their "9" position.

In order to cause that, for taking totals, the totalizer always is in its subtracting position when containing a negative total and in its adding position when containing a positive total the position of the control member 93 has always to correspond to the totalizer contents, i.e., on changing the positive state into a negative one of the totalizer, the control member is to be reversed to its right hand negative position (FIG. 6), on changing the negative state into a positive one, the control member must be reversed to the left hand positive position (FIG. 7).

Changing to a negative state of the totalizer only can occur when the totalizer is in its subtracting position (FIG. 7) and a changing to a positive state only when the totalizer is in its adding position (FIG. 6).

For bringing about the necessary reversing of the control member 93, between the rocking member 38 (FIG. 6) and a lower arm 108 of the control member 93 a pressure spring 109 in the form of a sheet spring is arranged, which is attached to a pin 111 of the control member and a pin 112 of the rocking member 38.

The two fastening pins 111, 112 for the pressure spring 109 are arranged thus that their connection line, in the subtracting position (FIG. 7) of the totalizer and in the positive position of the control member, passes on the left hand side of the axis 6 of the control member, the latter being rotatively influenced clockwise, so that on occurring of a negative passage from 0 to 9 in the highest order during the corresponding machine operation, the control member will be moved into its right hand negative position when being released by said passage.

In contradistinction thereto the connection line between the two pins 111, 112 passes on the right hand side of the axis 6 of the control member in the case where the control member is found in its negative position and the totalizer in its adding position (FIG. 6), so that when the totalizer changes to a positive state the control member aims at rocking counter clockwise into its positive position.

After the control member 93 has been reversed by a passage from 0 to 9 or 9 to 0 the pressure spring is in its untensioned state (FIGS. 4 and 5) in which the control member and the totalizer being in the same sign-positions.

When the totalizer for instance, contains a positive total, the control member 93 will be locked by the tens actuating lever 79 in its positive position. For performing a subtracting machine operation, the rocking member 38 will be rocked into the subtracting position as represented in FIG. 7, the control member 93 will be resiliently influenced clockwise in the direction of its negative position by the spring 109. When a negative passage thereby takes place in the highest order, the locking of the control member will be finished by the releasing movement of the tens actuating member 79 (FIG. 5), so that the pin 98 under the action of the spring 99 comes out of the notch 97 rocking the control member 93 clockwise under the action of the spring 109, so that the pin 98 comes to lie outside of the notch 96 (FIG. 5). Simultaneously a negative fugitive "1" will be introduced to the unit order in the above described manner.

On the next stretching of the toggle joint the displaced tens actuating member 79 of the highest order together with the displaced tens actuating members 79 of the other orders will be restored again into their locking position, whereby also the locking of the control member 93 in its negative position will be renewed. In this position of the control member the lugs 106, 107 (FIG. 10) of the adjusting bar 95 lie below the total key so that upon the following depressing of a total key for the effecting of a total taking operation of the machine the key counter lever 55 will be depressed with and its arm 47 will rock the push fork 42 into the subtracting position, so that in any case the subtracting position of the totalizer is secured for taking a total. Hence, the total taking takes place in the position of the totalizer wheel as represented in FIG. 3 whereby the subtracting tens teeth 71 will be rotated clockwise against the flank of the tens counter teeth 72 into the nine position.

When an additive cycle of operation takes place on negative contents of the totalizer the control member 93 and the rocking member 38 have the mutual position as represented in FIG. 6, in which the spring 109 acts resiliently counter clockwise against the control member, so that the latter tends to move into its positive position. This happens as soon as a positive passage takes place in the highest order. The tens actuating lever 79 moves then upwards and releases the locking 98, 103. Consequently, the control member 93 takes up again the position represented in FIG. 7 in which the lugs 106, 107 (FIG. 10) of the adjusting bar 95 lie outside of the working reach of the total keys. A following total taking will be performed therefore in the adding position of the totalalizer, whereby the adding tens teeth 61 will be returned towards the right flanks of the tens counter teeth 62 into the zero position.

Thus it is warranted, that on depressing of one of the two total keys, in the case that the totalizer contains a positive total, the adjusting bar 95 will not be depressed with and the totalizer remains in its adding position and that in the case where the totalizer contains a negative total, the adjusting bar 95 is moved with preparing the reversing of the totalizer in its subtraction position for taking a total.

On the upward and downward movement of the totalizer in the stretched position of the toggle joint the adding or subtracting wheels, respectively, come out of engagement with the gears 78 of the tens actuating levers only after the counter wheels already have been engaged into the actuating member 8. An unintentional displacement of the totalizer wheels, therefore, can not take place. When, however, the reversing for adding or subtracting, respectively, takes place simultaneously, with the upward and downward movement of the totalizer the totalizer wheels are unlocked for a short period. In order to avoid an unintentional displacement during this period a locking rod 113 (FIG. 3) is provided which is loosely mounted in curved slits 114 of the totalizer frame walls 9 and 11 and besides this in bevel slots 115 of the two blocks 19, 21 of the totalizer wheel cradle.

Upon rocking of the totalizer wheel cradle about their pins 20 the locking rod 113 is moved along the curved slits 114 and thereby displaced radially with respect to the shaft 22, whereby it temporarily engages the gaps of the wheels 25 locking the later temporarily.

What I claim is:

1. In an apparatus for taking negative totals in calculating machines, a balance totalizer comprising counting wheels in denominational order, differential actuators cooperating therewith, a total taking mechanism comprising means for returning said counting wheels by means of said differential actuators into the position "0," on positive total taking, and for advancing said counting wheels into the position "9," on negative total taking, a totalizer reversing and engaging mechanism for bringing said counting wheels into mesh with said differential actuators for additive or subtractive actuating, a control member automatically positionable in one or the other of two end positions corresponding to the positive or negative state of the totalizer, respectively, a pivot rotatably mounting said control member, operative connection between the counting wheel of the highest denominational order and said control member for moving the latter into one or the other of its end positions in dependence on the change of the positive state to the negative one of the totalizer and vice versa, a total taking key, a total taking key member cooperating therewith for adjusting said totalizer reversing and engaging mechanism for total taking operations, a subtracting key, a subtracting key member, cooperating therewith for adjusting said totalizer reversing and engaging mechanism for subtractive operation, a disengageable particular total key member movably mounted on said subtracting key member and connected with said control member and adjustable by same into an effective and an ineffective position with respect to said total taking key, said totalizer reversing and engaging mechanism comprising a rocking member movable into an additive or a subtractive rocking position for rocking the totalizer into an additive or subtractive position, respectively, a pressure spring pressing with its one end against a pin of said rocking member and with its other end against a pin of said control member urging the two pins away from each other, said two pins being adapted for moving in spaced relation within the space between the axis of said control member and the axis of said rocking member on rocking of said members, each pin having a shorter distance from the axis of its member than from the axis of the other member, the two end-positions of each pin being placed the one on the one side of the plane containing said two axes, the other at the other side of said plane, so that, when said two pins being positioned both on the same side of said plane the connecting line of said two pins is directed along the side of said pivot lying at the other side of said plane, whereby, when the control member is in its negative position it will be urged into its positive position when the rocking member assumes its additive position, and vice versa.

2. In an apparatus according to claim 1, a locking device for positively locking said control member in one of its end positions, tens transfer actuating members one for each order, said locking device being formed by a lug of the tens transfer actuating member of the highest order, and a locking member, said lug and said locking member directly cooperate with said control member, and means for releasing this locking device on change of the positive into the negative state of the totalizer and vice versa, whereby, as soon as said locking has been released, the said control member is urged by said pressure spring from its positive position into its negative position, when the rocking member assumes its subtractive position, and from its negative position into its positive position, when the rocking member assumes its additive position.

3. In an apparatus according to claim 1, a double notch in said control member, tens transfer actuating members one for each order, detent levers for locking said tens actuating members, a locking lever cooperating with the tens actuating member of the highest order, the latter having a lock pin on said locking lever cooperating with said double-notch, and a locking lug on said locking lever, whereby said control member is positively held in its locked position by means of one of its notches and is freed on releasing of the tens transfer actuating member of the highest order on each change of the positive state into a negative state of the totalizer and vice versa.

4. In an apparatus according to claim 1, a double-notch in said control member, tens transfer actuating members one for each order, detent levers for locking said tens transfer actuating members, a locking lever cooperating with the tens transfer actuating member of the highest order having a locking lug, and a lock pin on said locking lever cooperating with said double notch, whereby said control member is positively held in its locked position by means of one of its notches and is freed on releasing of the tens transfer actuating member of the highest order, means for restoring the released tens transfer actuating members, and connections between said restoring means and said locking lever for the highest order, whereby the latter is restored simultaneously with the tens transfer actuating members into the locking position.

5. In an apparatus according to claim 1, said totalizer reversing and engaging mechanism comprising a toggle joint connecting the totalizer with the machine frame for effecting the engagement of the totalizer with said differential actuators in its stretched position, a pushing fork linked to one of the two toggle joint members, a rocking axle of the totalizer, two lugs on the totalizer arranged at each side of the axle alternately cooperating with said pushing fork dependently on the position of the latter, a projection at the said toggle joint member linked to said pushing fork, a spring actuated locking pawl cooperating with said projection for holding it and the toggle joint in the stretched position during the return movement of the amount actuators during subtotal operations, operative means between said locking pawl and the total key for holding said locking pawl in its ineffective position, a restoring bar for restoring the actuators into their home position operative connections between said restoring bar and said locking pawl for holding the latter in its ineffective position in the position of rest of the restoring bar.

References Cited in the file of this patent

UNITED STATES PATENTS

| | | |
|---|---|---|
| 2,118,588 | Butler | May 24, 1938 |
| 2,203,336 | Landsiedel | June 4, 1940 |
| 2,317,086 | Racz | Apr. 20, 1943 |
| 2,317,284 | Magnusson | Apr. 20, 1943 |
| 2,361,707 | Pott | Oct. 31, 1944 |
| 2,550,581 | Mehan | Apr. 24, 1951 |
| 2,792,990 | Sepanak | May 21, 1957 |